US012420650B2

(12) United States Patent
Ogawa et al.

(10) Patent No.: US 12,420,650 B2
(45) Date of Patent: Sep. 23, 2025

(54) CHARGING SYSTEM

(71) Applicant: KABUSHIKI KAISHA TOSHIBA, Tokyo (JP)

(72) Inventors: Kenichirou Ogawa, Kawasaki Kanagawa (JP); Tetsu Shijo, Setagaya Tokyo (JP); Qiang Lin, Kawasaki Kanagawa (JP); Yasuhiro Kanekiyo, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 628 days.

(21) Appl. No.: 17/891,975

(22) Filed: Aug. 19, 2022

(65) Prior Publication Data
US 2023/0302924 A1 Sep. 28, 2023

(30) Foreign Application Priority Data
Feb. 4, 2022 (JP) .................. 2022-016524

(51) Int. Cl.
*B60L 53/10* (2019.01)
*B60L 53/20* (2019.01)
*B60L 53/50* (2019.01)
*B60L 53/62* (2019.01)

(52) U.S. Cl.
CPC ............... *B60L 53/11* (2019.02); *B60L 53/20* (2019.02); *B60L 53/50* (2019.02); *B60L 53/62* (2019.02)

(58) Field of Classification Search
CPC .......... B60L 53/11; B60L 53/20; B60L 53/50; B60L 53/62; H02J 2310/48; H02J 7/007

USPC ......................................................... 320/109
See application file for complete search history.

(56) References Cited

U.S. PATENT DOCUMENTS

| | | | |
|---|---|---|---|
| 2011/0270463 A1 | 11/2011 | Weiss et al. | |
| 2013/0020993 A1* | 1/2013 | Taddeo | B60L 53/65 320/109 |
| 2013/0294119 A1 | 11/2013 | Kimura et al. | |
| 2023/0264591 A1* | 8/2023 | Silorio | B60L 53/11 320/109 |

FOREIGN PATENT DOCUMENTS

| | | |
|---|---|---|
| JP | 2009225599 A | 10/2009 |
| JP | 2012170192 A | 9/2012 |

(Continued)

OTHER PUBLICATIONS

Noro, Yasuhiro, "Proposal of Inverter Control Method for Electric Power System Consisting of Energy Storages", IEEJ Transactions on Power and Energy (vol. 138, No. 11), 2018, pp. 854-861, DOI: 10.1541/ieejpes.138.854.

(Continued)

*Primary Examiner* — Paul Dinh
(74) *Attorney, Agent, or Firm* — Holtz, Holtz & Volek PC

(57) ABSTRACT

According to one embodiment, a charging system charges a secondary battery provided in a mobile body. The charging system includes a controller which selects one of a first charge mode which charges the secondary battery by simulating a synchronous generator and a second charge mode which charges the secondary battery without simulating the synchronous generator, and a charger which charges the secondary battery by an operation corresponding to the first charge mode or the second charge mode selected by the controller.

20 Claims, 12 Drawing Sheets

(56) References Cited

FOREIGN PATENT DOCUMENTS

| | | |
|---|---|---|
| JP | 2015127164 A | 7/2015 |
| JP | 2017046507 A | 3/2017 |
| JP | 2017147803 A | 8/2017 |

OTHER PUBLICATIONS

Japanese Office Action (and an English language translation thereof) dated Jan. 21, 2025, issued in counterpart Japanese Application No. 2022-016524.

* cited by examiner

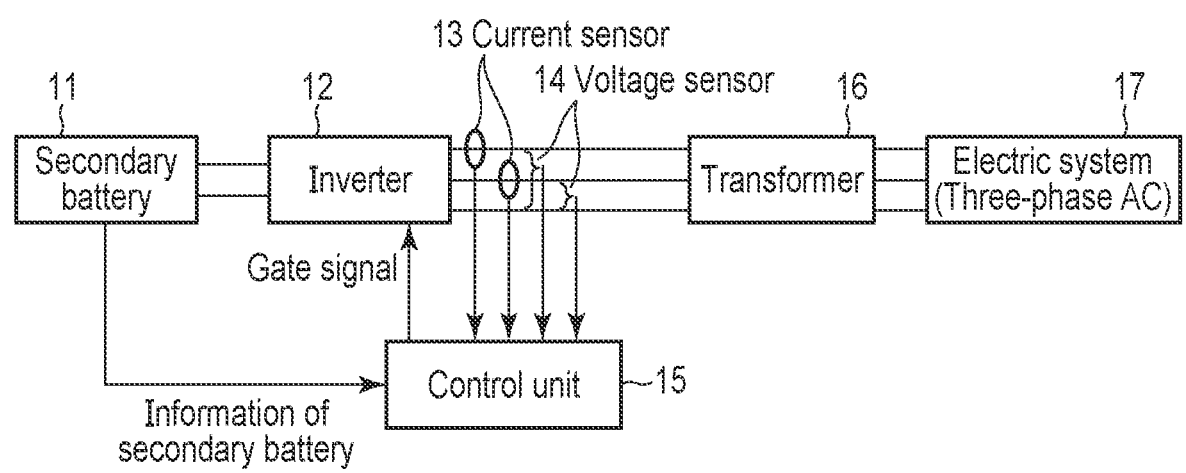
F I G. 1

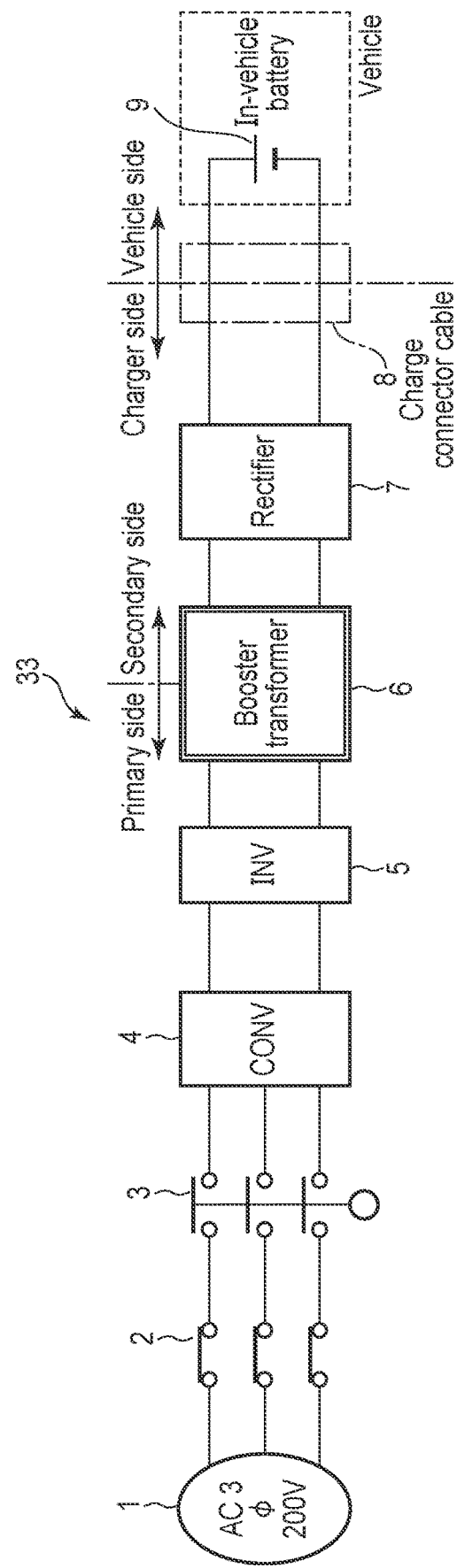
F I G. 6

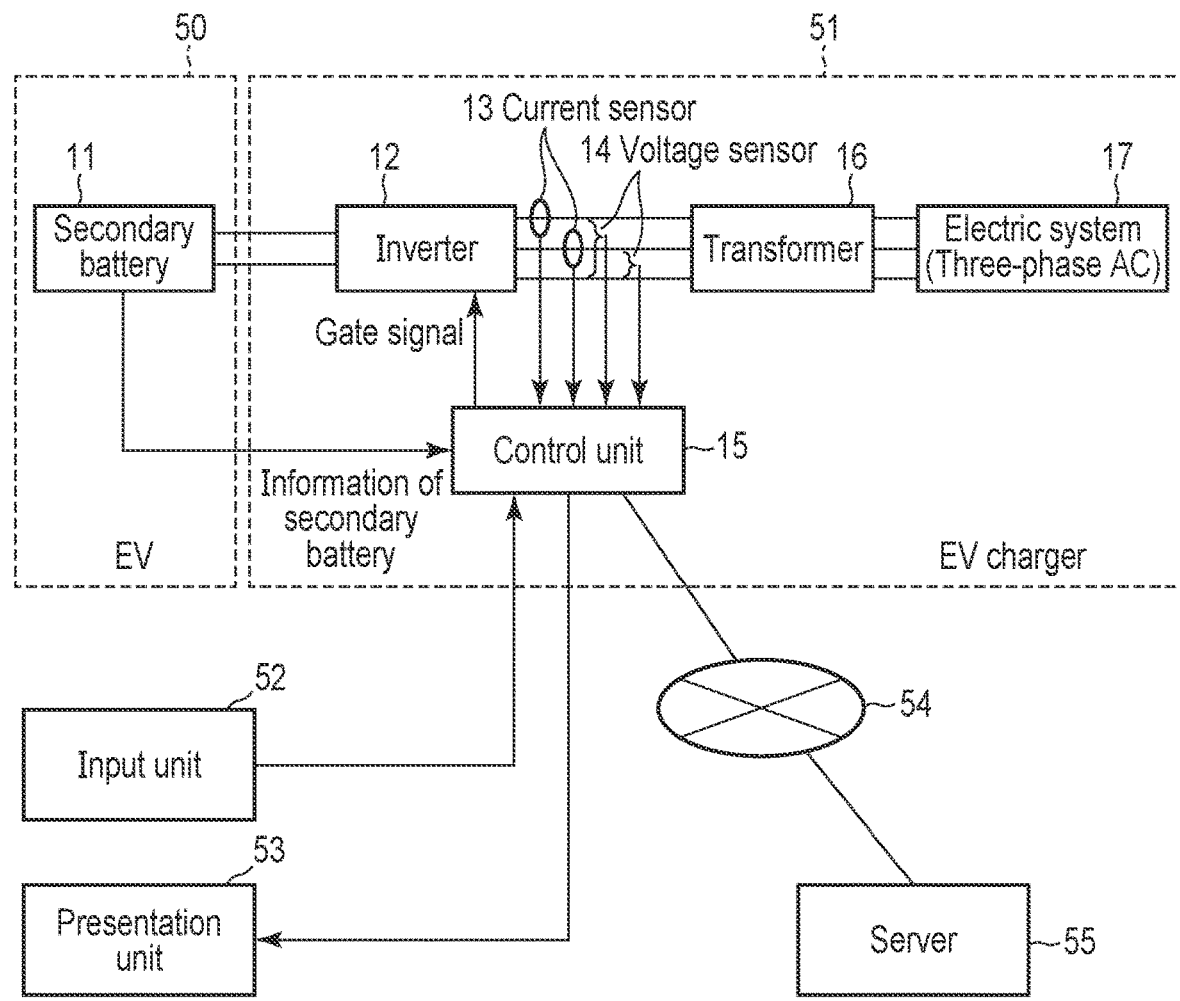
F I G. 7

| Charge mode | Merits | Demerits |
|---|---|---|
| Mode with inertial force (First charge mode) | Suppress electric change | Take more time to charge |
| | Cheap | Place load on battery |
| Mode without inertial force (Second charge mode) | Fast charge | Not suppress electric change |
| | Not place load on battery | Expensive |

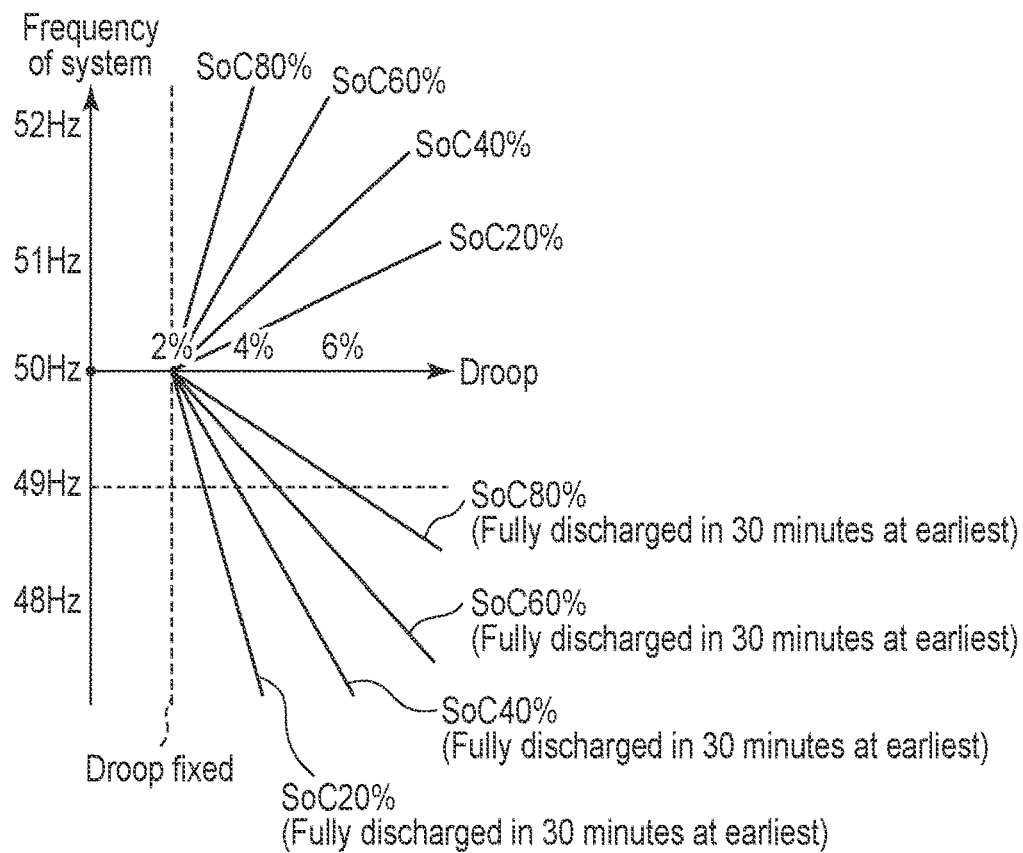
F I G. 16
| Information of type of vehicle | Information of inertial force |
|---|---|
| D1 | With inertial force, F1 |
| D2 | With inertial force, F2 |
| D3 | Without inertial force, — |
| ⋮ | ⋮ |
F I G. 17

CHARGING SYSTEM

CROSS-REFERENCE TO RELATED APPLICATIONS

This application is based upon and claims the benefit of priority from Japanese Patent Application No. 2022-016524, filed Feb. 4, 2022, the entire contents of which are incorporated herein by reference.

FIELD

Embodiments described herein relate generally to a charging system used for an electric mobile body.

BACKGROUND

As an electric mobile body, an electric vehicle (EV) is widely known. An electric vehicle comprises an in-vehicle secondary battery and runs on a motor by charging the secondary battery through a charger provided in a charging station, etc.

For example, if the demand for electricity becomes temporarily high while an electric vehicle is charged in a charging station, an electric change (frequency change) may occur in an electric system. In the present circumstances, normally, a measure against such an electric change is not taken in general chargers provided in charging stations.

BRIEF DESCRIPTION OF THE DRAWINGS

FIG. 1 is a diagram showing a schematic configuration of a virtual synchronous generator.

FIG. 6 is a diagram showing an example of a circuit configuration of a fast charger.

FIG. 7 is a diagram showing a configuration of a charging system according to an embodiment.

FIG. 16 is a diagram showing the relationship between a SoC and a droop rate.

FIG. 17 is a diagram showing an example of a table for determining an inertial force in the embodiment.

DETAILED DESCRIPTION

Figure 2:
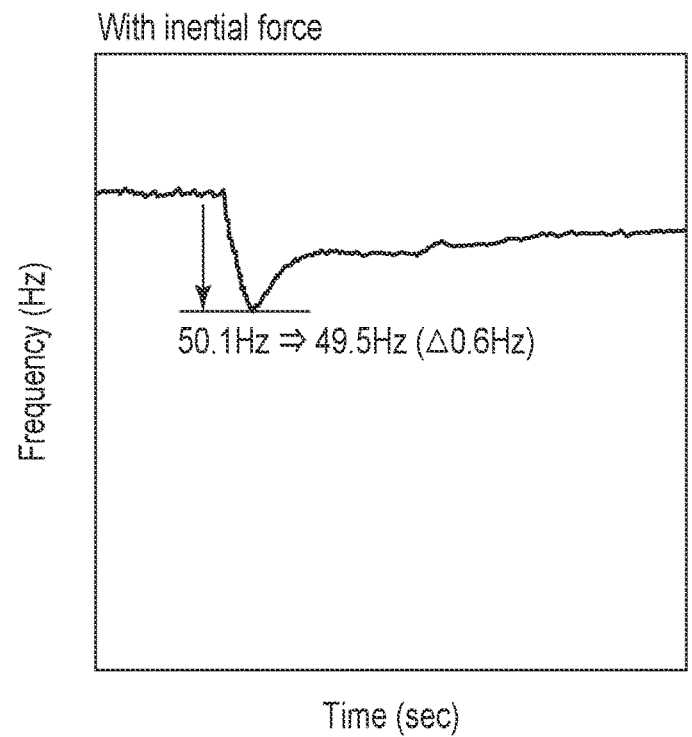
FIG. 2 is a diagram showing frequency characteristics when an inertial force arises in the middle of charging.

Embodiments will be described hereinafter with reference to the accompanying drawings.

In general, according to one embodiment, a charging system charges a secondary battery provided in a mobile body. The charging system includes a controller which selects one of a first charge mode which charges the secondary battery by simulating a synchronous generator and a second charge mode which charges the secondary battery without simulating the synchronous generator, and a charger which charges the secondary battery by an operation corresponding to the first charge mode or the second charge mode selected by the controller.

The disclosure is merely an example and is not limited by contents described in the embodiments described below. Modification which is easily conceivable by a person of ordinary skill in the art comes within the scope of the disclosure as a matter of course. In addition, in some cases, in order to make the description clearer, the sizes, shapes, etc., of the respective parts are modified and illustrated schematically in the drawings, rather than as an accurate representation of what is implemented. Constituent elements corresponding to each other in a plurality of drawings are denoted by like reference numbers and their detailed descriptions may be omitted unless necessary.

The charging system of the present embodiment assumes the control system of a virtual synchronous generator. The virtual synchronous generator is also called a virtual synchronous generation inverter. The virtual synchronous generator is a control system which simulates the operation of a synchronous generator on a computer and causes an inverter to perform the simulated operation.

FIG. 1 shows a schematic configuration of a virtual synchronous generator.

A virtual synchronous generator comprises a secondary battery 11, an inverter 12, a current sensor 13, a voltage sensor 14, a control unit 14 and a transformer 16. The control unit 15 controls the charge unit in the first charge mode described later based on the output current of the inverter 12 detected by the current sensor 13 and the output voltage of the inverter 12 detected by the voltage sensor 14. In other words, when the first charge mode with an inertial force is set, the control unit 15 controls the inverter 12 constituting the charge unit so as to have a property equivalent to a synchronous generator. Since the virtual synchronous generator has been publicly known by "Proposal of Inverter Control Method for Electric Power System Consisting of Energy Storages, IEEJ Transactions on Power and Energy (Vol. 138, No. 11, 2018, pp. 854-861)", etc., detailed description thereof is omitted here.

Regarding the virtual synchronous generator, the matter in which an inertial force arises in the middle of discharging has been known. However, an inertial force in the middle of charging has not been reported. The inventor of the present application confirmed that an inertial force also arose in the middle of charging based on the results of experiment shown in FIG. 2 and FIG. 3.

Figure 3:
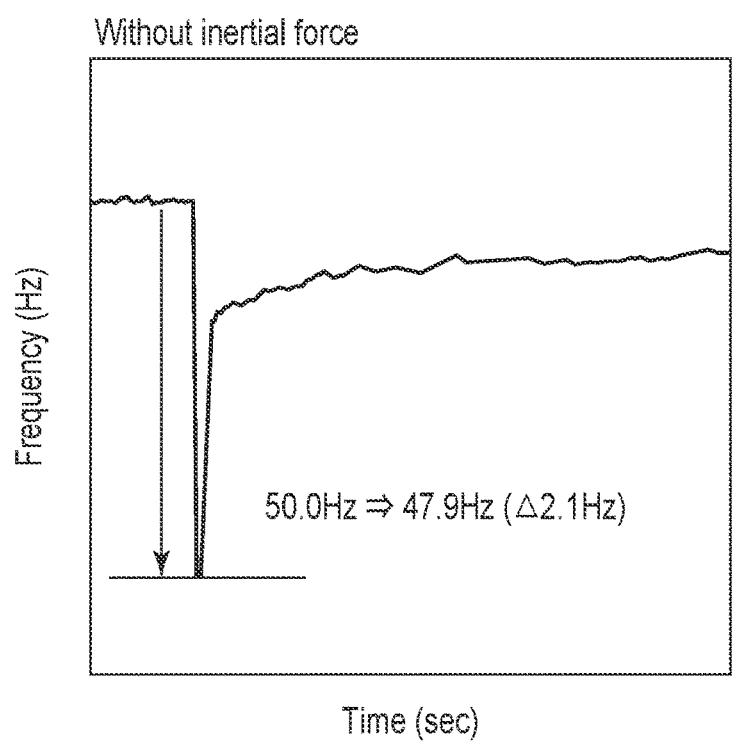
FIG. 3 is a diagram showing frequency characteristics when an inertial force does not arise in the middle of charging.

FIG. 2 is a diagram showing frequency characteristics when an inertial force arises in the middle of charging. FIG. 3 is a diagram showing frequency characteristics when an inertial force does not arise in the middle of charging.

It is assumed that a secondary battery system is charged by receiving AC power having a frequency of 50 Hz from an electric system. For example, in a case where the secondary battery system operates as a virtual synchronous generator when a load of 40 KW is applied to the electric system side, the virtual synchronous generator provides an inertial force in addition to the inertial force of the synchronous generator of the electric power plant connected to the electric system. Therefore, as shown in FIG. 2, the reduction in frequency is less ($\Delta 0.6$ Hz). In the case of operation as a normal secondary battery system without an inertial force, only the inertial force of the synchronous generator of the electric power plant connected to the electric system is provided. Therefore, as shown in FIG. 3, the reduction in frequency is great ($\Delta 2.1$ Hz). These results reveal that an inertial force also arises in the middle of charging in the virtual synchronous generator. Thus, the electric system is provided with an inertial force in the middle of charging by the effect of the virtual synchronous generator, thereby suppressing an electric change (frequency change).

Hereinafter, the charging system of the present embodiment is explained, focusing attention on an inertial force in the middle of charging in the virtual synchronous generator. Here, as an example of an electric mobile body, this specification looks at an electric vehicle (EV).

[Basic Configuration]

Figure 4:
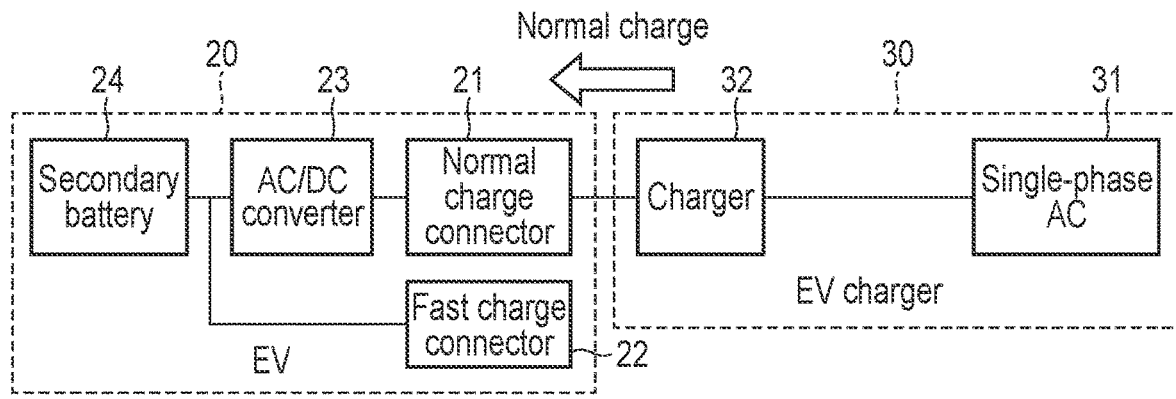
FIG. 4 is a diagram showing a configuration of normal charge of an EV.
Figure 5:
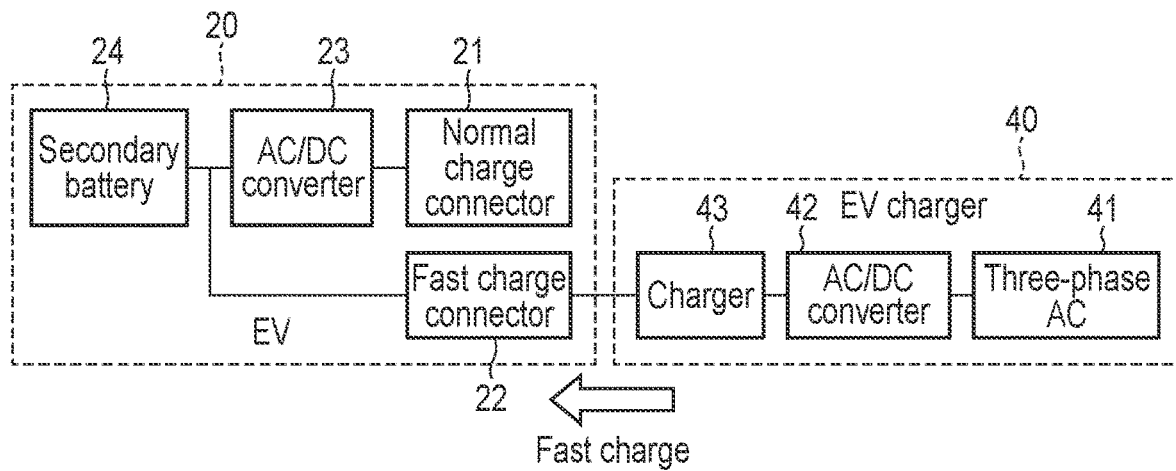
FIG. 5 is a diagram showing a configuration of fast charge of an EV.

FIG. 4 is a diagram showing a configuration of normal charge of an EV. FIG. 5 is a diagram showing a configuration of fast charge of an EV. An EV 20 comprises a normal charge connector 21 and a fast charge connector 22 and is configured to store the electric power of a secondary battery 24 by normal charge or fast charge.

The normal change connector 21 is connected to the secondary battery 24 via an AC/DC converter 23. The normal charge of the EV is performed by connecting a normal charger 30 to the normal charge connector 21. The normal charger 30 comprises a charger 32 which supplies the electric power (100 V or 200 V) of a single-phase AC 31 to the EV 20. The fast charge of the EV is performed by connecting a fast charger 40 to the fast charge connector 22. The fast charger 40 comprises an AC/DC converter 42 which converts the electric power (200 VAC) of a three-phase AC 41 to DC voltage, and a charger 43 which supplies the electric power to which the DC conversion has been applied to the EV 20. The inertial force described above is provided by the EV when fast charge is performed.

FIG. 6 is a diagram showing an example of a circuit configuration of a fast charger 33. The left side of the figure shows the main circuit of the fast charger 33. The main circuit of the fast charger 33 comprises an earth leakage breaker 2, an electromagnetic switch 3, a converter 4, an inverter 5, a booster transformer 6, a rectifier 7, etc.

The earth leakage breaker 2 detects overcurrent or leakage on the primary side and shuts off the electric power supplied from a three-phase AC power source 1. The electromagnetic switch 3 is turned on when charging is performed, and causes the electric power supplied from the three-phase AC power source 1 to flow from the primary side to the secondary side. The converter 4 converts alternating voltage (200 VAC) to direct voltage (350 VDC). The inverter 5 converts direct voltage (350 VDC) to an alternating voltage having a high frequency. The booster transformer 6 boosts the high-frequency alternating voltage output from the inverter 5. The rectifier 7 rectifies the alternating voltage boosted by the booster transformer 6. The alternating voltage rectified by the rectifier 7 is provided to a secondary battery 9 on the vehicle side via a charge connector cable 8. It should be noted that FIG. 6 is merely an example and the circuit of the fast charger 33 is general. Thus, the explanation of the details of its operation is omitted here.

EVs include EV which have an inertial force and EV which do not have an inertial force. EV which have an inertial force refer to EV which can adjust electric power by a charging and discharging operation based on algorithm simulating a synchronous generator. In other words, EV which have an inertial force are EV which have the ability to provide an inertial force by the effect of a synchronous generator. EV which do not have an inertial force refer to EV which cannot adjust electric power by a charging and discharging operation based on algorithm simulating a synchronous generator. In other words, EV which do not have an inertial force are EV which do not have the ability to provide an inertial force by the effect of a synchronous generator.

Hereinafter, this specification assumes an EV which has an inertial force.

When the configuration of the virtual synchronous generator shown in FIG. 1 is divided into the EV side and the charger side, the configuration can be shown like FIG. 7. FIG. 7 is a diagram showing a configuration of a charging system according to an embodiment and shows a configuration when the EV and the charger has a one-on-one relationship. In the figure, the reference number "50" denotes the EV to be charged, and the EV has an inertial force. The reference number "51" denotes a charger configured to perform fast charge.

The EV 50 comprises the secondary battery 11 for storing the electric power supplied from the charger 51. For the secondary battery 11, for example, a lithium-ion battery is used. The charger 51 has a function for realizing a virtual synchronous generator by software control. An input unit 52 and a presentation unit 53 are connected to the charger 51.

The input unit 52 comprises an input device such as a keyboard, a touch panel or an IC card reader, and is used when, for example, the operator of the EV 50 performs the selection operation of a charge mode. The presentation unit 53 comprises a presentation device such as a liquid crystal display device, and is used when a charging fee corresponding to a charge mode, etc., is presented to the operator of the EV 50.

The input unit 52 may be provided in the charger 51 or may be provided in the EV 50. Similarly, the presentation unit 53 may be provided in the charger 51 or may be provided in the EV 50. The input unit 52 and the presentation unit 53 may be configured as separate devices, or may have an integrated configuration like a touch panel.

The input unit 52 and the presentation unit 53 are individually connected to the control unit 15 of the charger 51 with a wire or wirelessly. The control unit 15 comprises a general-purpose computer (controller) comprising CPU, ROM, RAM or the like, and controls the charging operation of the charger 51 by reading a predetermined control program (refer to FIG. 18).

In the present embodiment, the control unit 15 has a function of selecting one of a first charge mode which charges the secondary battery by simulating a synchronous generator and a second charge mode which charges the secondary battery without simulating the synchronous generator. The control unit 15 has a function of setting a charging fee corresponding to a charge mode. Further, the control unit 15 is connected to an external server 55 via a communication network 54. The control unit 15 has a function of obtaining environmental information and the transaction information of an electricity market from the server 55 and reflecting the information on the charging fee. The control unit 15 may be provided in the charger 51 or may be separate from the charger 51.

Figure 8:
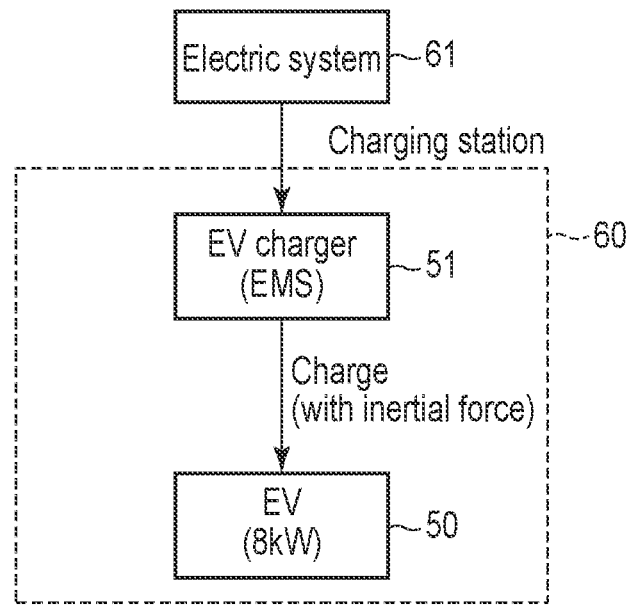
FIG. 8 is a diagram showing a configuration in which an EV and a charger perform charging in a one-on-one relationship in a charging station in the embodiment.

FIG. 8 is a diagram showing a configuration in which the EV and the charger perform charging in a one-on-one relationship in a charging station. In practice, the charger 51 is provided in a charging station 60 and operates by receiving the electric power supplied from an electric system 61 provided in a high-order position of the charging station 60.

As shown in FIG. 8, even when the EV 50 and the charger 51 perform charging in a one-on-one relationship, an inertial force is provided by the EV 50 in the middle of charging by the effect of a virtual synchronous generator, thereby exerting an effect of suppressing an electric change (frequency change) in the electric system 61. In the figure, the EMS refers to an energy management system and monitors the state of the electric power supplied from the electric system 61, the state of charging of the EV 50, etc. The example of FIG. 8 shows a state where the EV 50 is charged at 8 kW.

Figure 9:
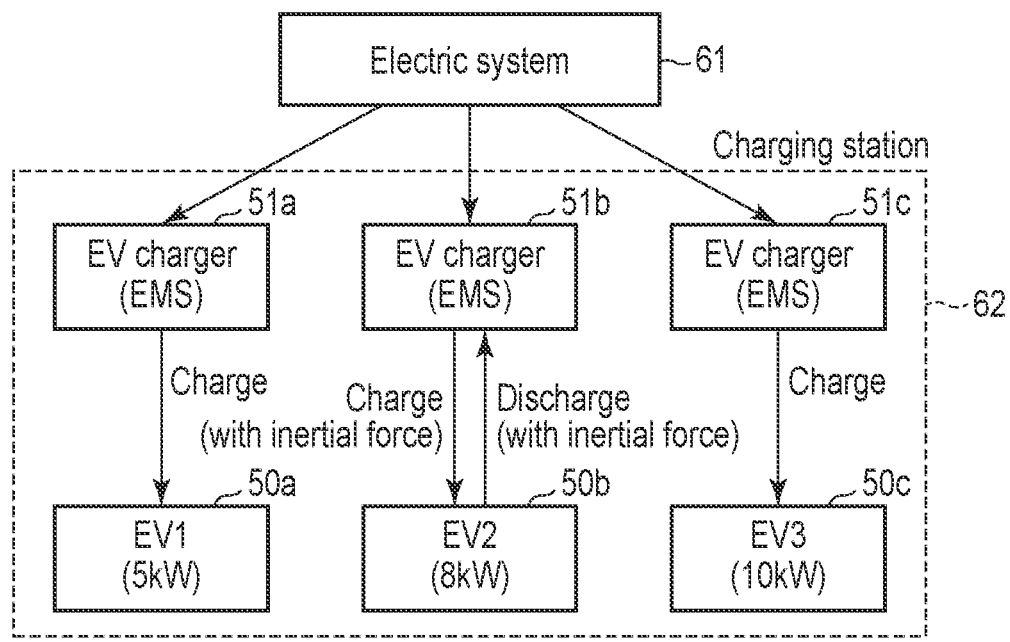
FIG. 9 is a diagram showing a configuration in which a plurality of chargers are provided in a charging station in the embodiment.

FIG. 9 is a diagram showing a configuration in which a plurality of chargers are provided in a charging station.

In the example of FIG. 9, three chargers 51a, 51b and 51c are provided in a charging station 62. The chargers 51a, 51b and 51c have a function of a virtual synchronous generator and are configured to cause EVs 50a, 50b and 50c to provide an inertial force in a charging direction and an inertial force in a discharging direction.

Figure 10:
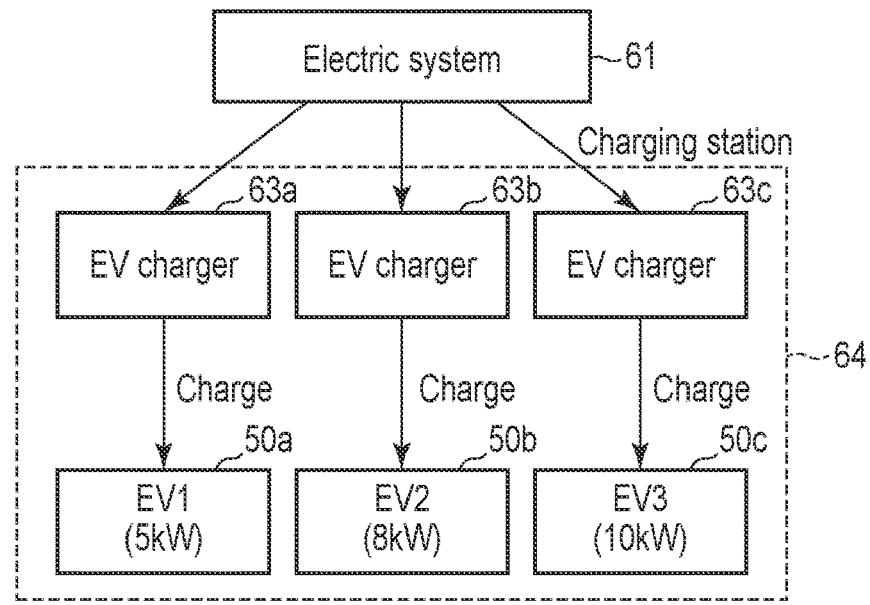
FIG. 10 is a diagram showing a configuration in which a plurality of chargers are provided in a general charging station.

An inertial force in a charging direction refers to an inertial force provided by a charge unit while an EV is charged. An inertial force in a discharging direction refers to an inertial force provided by a charge unit while an EV discharges. In the charging station 62, for example, the electricity of the EV 50b can be discharged and passed to another EV 50a or EV 50b. At this time, an inertial force is provided. By this configuration, as well as an electric change in the electric system 61, an electric change in the charging station 62 can be suppressed. In contrast, as shown in FIG. 10, even when an electric change occurs while the EVs are charged using the normal chargers 63a, 63b and 63c provided in a general charging station 64, the electric change cannot be suppressed.

Figure 11:
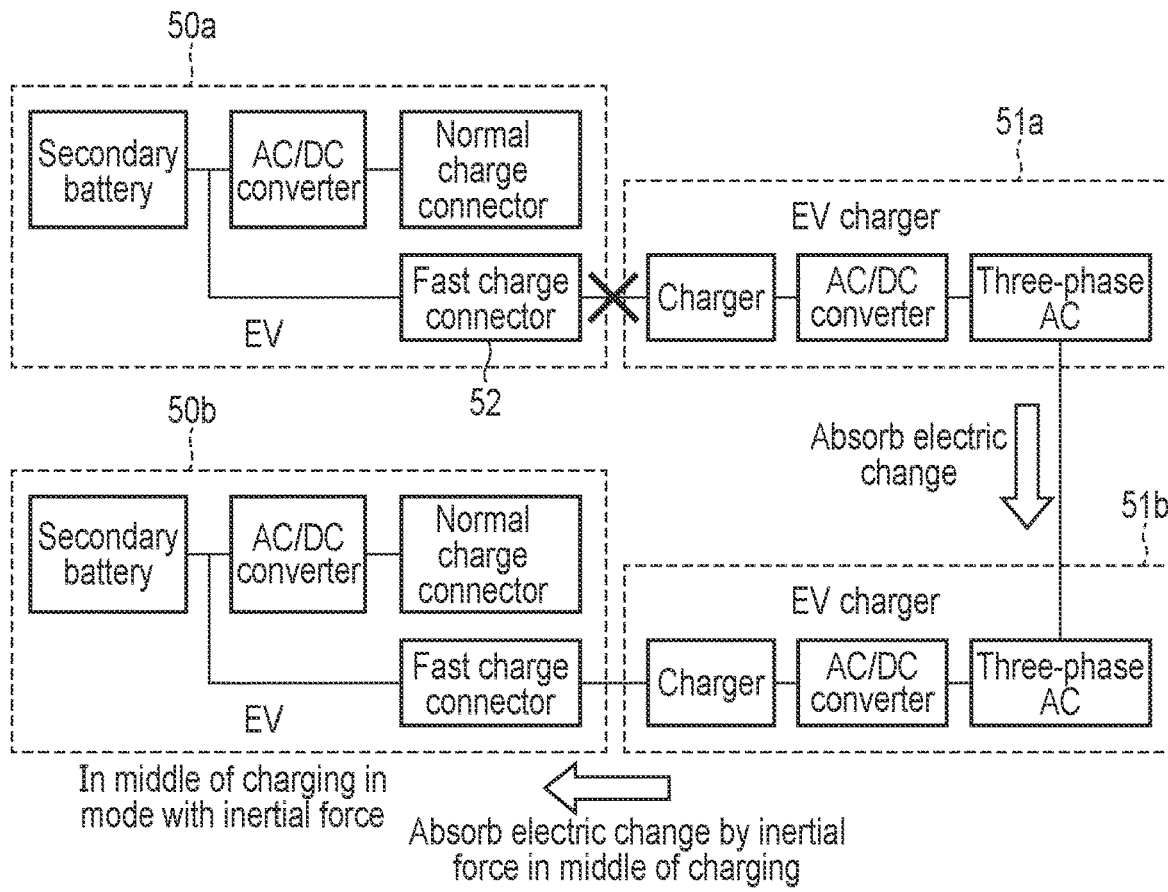
FIG. 11 is a diagram showing how an EV which is in the middle of charging in a mode with an inertial force absorbs an electric change in the embodiment.
Figure 12:
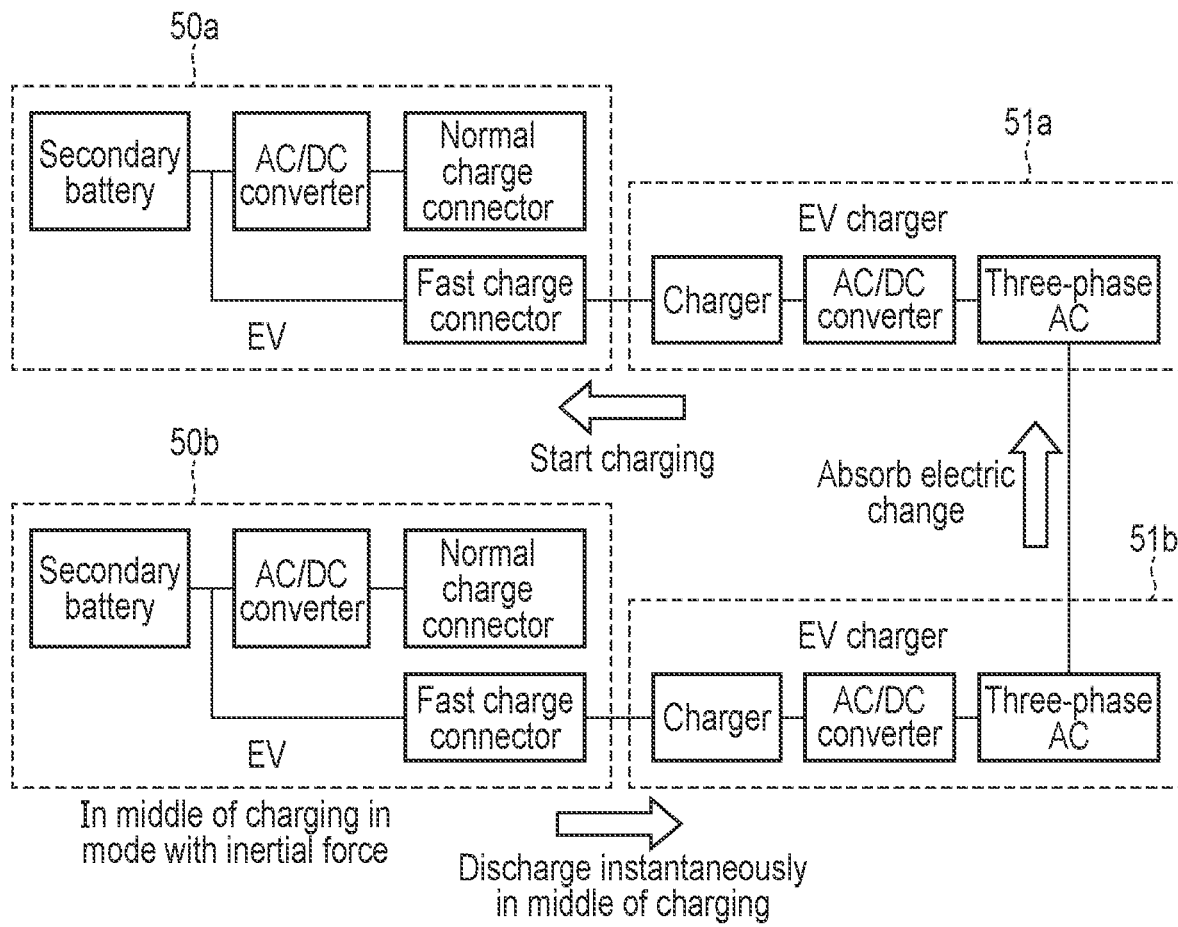
FIG. 12 is a diagram showing how an EV which is in the middle of charging in a mode with an inertial force discharges instantaneously and absorbs an electric change in the embodiment.

Here, this specification explains the suppression of an electric change in the charging station 62 with reference to FIG. 11 and FIG. 12. FIG. 11 shows how an EV which is in the middle of charging in a mode with an inertial force absorbs an electric change. FIG. 12 shows how an EV which is in the middle of charging in a mode with an inertial force discharges instantaneously and absorbs an electric change.

Now, it is assumed that, in the charging station 62, the EV 50a is connected to the charger 51a, and the EV 50b which is different from the EV 50a is connected to the charger 51b. The EVs 50a and 50b are EVs having an inertial force. At the moment the EV 50a stops charging, the electric power becomes more than needs, and an electric change occurs in the electric system 61. At this time, as shown in FIG. 11, another EV 50b which is in the middle of charging can absorb the electric change. Conversely, at the moment the EV 50a starts charging, the electric power becomes insufficient, and an electric change occurs. In this case, as shown in FIG. 12, the electric change can be absorbed if another EV 50b discharges instantaneously.

The chargers 51a, 51b and 51c comprise an EMS which monitors the electric change of the AC portion of the electric system 61, and are configured to switch the operation between charging and discharging such that an electric change in the electric system 61 can be absorbed by one of the EVs 50a, 50b and 50c if the change happens. It should be noted that there is no need to connect the chargers 51a, 51b and 51c to each other by a control line. The chargers operate independently from each other.

Figure 13:
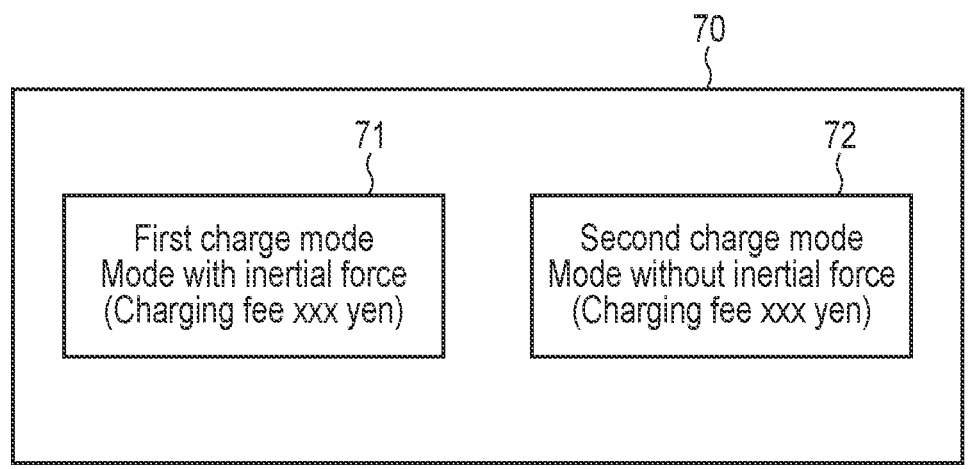
FIG. 13 is a diagram showing an example of a selection screen of a charge mode in the embodiment.

FIG. 13 is a diagram showing an example of a selection screen of a charge mode.

For example, the operator of the EV selects a charge mode, using a touch panel 70 as shown in FIG. 13. The touch panel 70 corresponds to the input unit 52 and the presentation unit 53 shown in FIG. 7 and has both an input function and a display function. The touch panel 70 may be provided in each of the chargers 51a, 51b and 51c in the charging station 62 or may be detachably provided in each of the EVs 50a, 50b and 50c. When the touch panel 70 is provided in each of the EVs 50a, 50b and 50c, the EVs may be connected to an applicable charger in the charging station 62 by wireless communication.

In the example of FIG. 13, on the screen of the touch panel 70, a selective item 71 for selecting the first charge mode with an inertial force and a selective item 72 for selecting a second charge mode without an inertial force are provided. In an EV having an inertial force, both the first charge mode and the second charge mode can be selected. When the first charge mode is selected, an inertial force is provided by the EV by a charging and discharging operation in accordance with algorithm simulating a synchronous generator. When the second charge mode is selected, a normal charging and discharging operation is performed, and an inertial force is not provided by the EV.

In the case of an EV which does not have an inertial force, the EV can be charged only in the second charge mode without an inertial force. If such an EV is charged in the first charge mode with an inertial force, a load is applied to the secondary battery, thereby causing failure. As described later, the configuration should be preferably set such that the type of each EV is determined and only the second charge mode can be selected for EVs which do not have an inertial force.

[Setting of Charging Fee]

The charger 51 shown in FIG. 7 (specifically, the control unit 15 provided in the charger 51) sets the charging fee by the following method and presents it to the operator of the EV 50 through the presentation unit 53. The presentation method of the changing fee may be display or sound. Alternatively, the charging fee may be presented by both display and sound.

(1) Setting of Charging Fee Corresponding to Charge Mode

On the touch panel 70 shown in FIG. 13, a charging fee corresponding to a charge mode is displayed. For the second charge mode, a standard fee is set in consideration of the current electricity market. Since the first charge mode has an effect of suppressing an electric change by providing an inertial force, the charging fee is set by discounting the fee of the effect. For example, when the charging fee of the second charge mode is 150 yen per hour, the charging fee of the first charge mode is set so as to be 100 yen per hour.

Figures 14, 15:
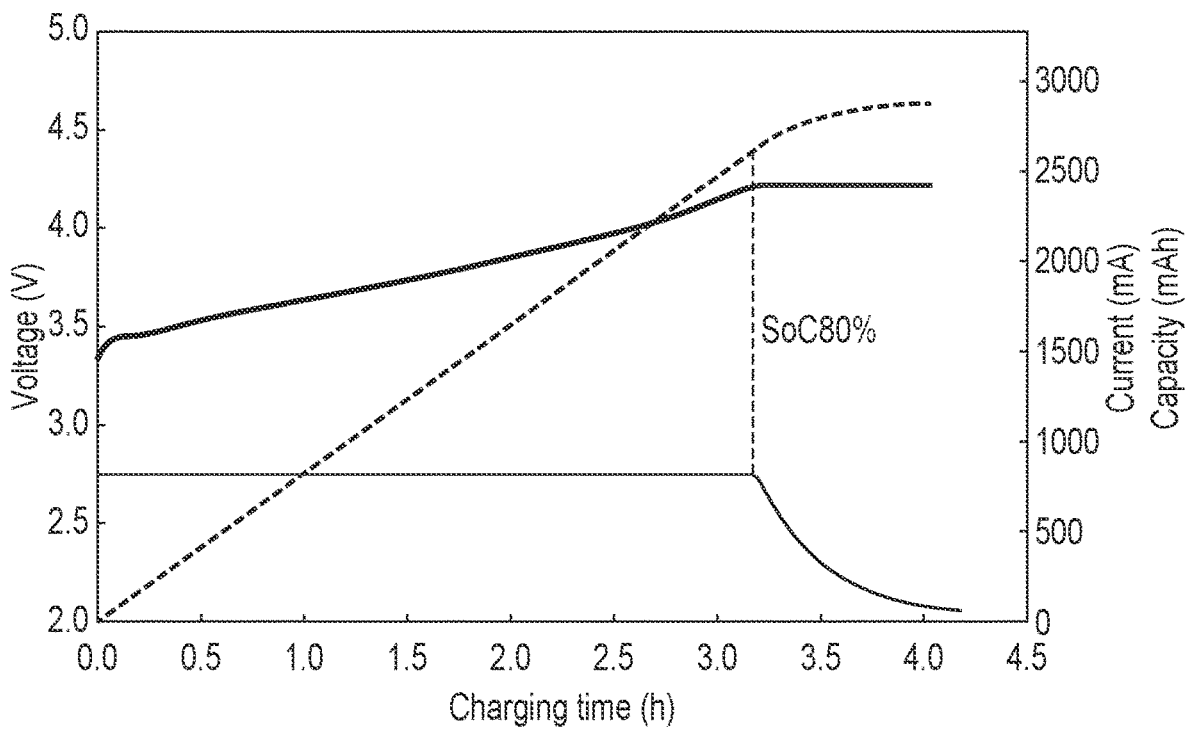
FIG. 14 is a diagram showing the merits and demerits of a first charge mode and a second charge mode in the embodiment.
FIG. 15 is a diagram for explaining a charging operation of a general lithium-ion battery.

FIG. 14 is a diagram showing the merits and demerits of the first charge mode and the second charge mode. The first charge mode with an inertial force has demerits in respect that it requires more time than normal fast charge and places a load on the secondary battery. In the second charge mode without an inertial force, the EV can be charged fast, and further, a load on the secondary battery is less. However, as the second charge mode does not provide an inertial force, the charging fee is relatively higher than the first charge mode. Thus, for example, when the operator of the EV has enough time, the operator may select the first charge mode to charge the EV. When the operator does not have enough time, the operator may select the second charge mode to charge the EV. In this way, the operator can select a suitable mode depending on the need.

(2) Setting of Charging Fee Corresponding to Remaining Amount of Battery

An inertial force refers to instantaneous power discharge or charge. In other words, when an inertial force is great, the amount of instantaneous discharge or charge is great. For example, in the case of an electric system of three-phase 200 V, the voltage is constant at 200 V. Thus, when an inertial force is great, the current of instantaneous charge or discharge is great. This performance depends on the performance of the secondary battery and the performance of the inverter.

FIG. 15 is a diagram for explaining a charging operation of a general lithium-ion battery and shows the change in voltage, current and capacity when the battery is charged by a constant current constant voltage (CCCV) system. The CCCV system is a system for firstly charging a battery by a constant current (CC) system and switching it to a constant voltage (CV) system to charge the battery at the time the voltage reaches a preset value.

Normally, CC charge is switched to CV charge when the state of charge (SoC) is approximately 80%. The SoC indicates a proportion obtained by excluding the amount of released electricity from the state in which a battery (secondary battery) is fully charged. The SoC is also called a remaining capacity. As a unit indicating the relative amount of current, "C" is used, and 1 C refers to a current value in which a cell having a nominal capacity value is constant current discharged and the discharge is finished in an hour.

In a cell having a nominal capacity value of 10 Ah, 1 C is equal to 10 A. To normal lithium-ion batteries, 1 C charge is applied. To lithium-ion batteries which can be charged fast, 2 C charge and 3 C charge can be applied. For example, when 1 C charge is applied to a lithium-ion battery of 20 Ah, the charge is performed at a current of 20 A in a CC charging area. When 2 C charge is applied to a lithium-ion battery of 10 Ah, the charge is performed at a current of 20 A in a CC charging area. Thus, in a CC charging area, an inertial force which is provided by applying 1 C charge (20 A) to a battery of 20 Ah is substantially equal to an inertial force which is provided by applying 2 C charge (20 A) to a battery of 10 Ah. However, damage to a battery by 2 C charge is larger than 1 C charge. Therefore, even if the inertial forces are the same as each other, for example, 2 C charge may be set so as to be cheaper than 1 C charge. Thus, their charging fees may be differentiated from each other.

(3) Setting of Charging Fee Corresponding to Inertial Force

The first charge mode with an inertial force has a plurality of fee structures. Of the fee structures, a charging fee corresponding to the inertial force of the EV 50 is presented. In this case, the charging fee is set so as to be low for EVs having a great inertial force and so as to be high for EVs having a less inertial force. The magnitude of the inertial force is substantially proportional to the amount of current which can be instantaneously supplied to the secondary battery 11 at the time of charging. Thus, the rated current of CC charge is set as the index of an inertial force, and a charging fee corresponding to the rated current is set and presented to the operator of the EV 50. In the case of a comparison using the same battery capacity (Ah), as EVs in which the rated current of CC charge is great have a great inertial force, the charging fee is set so as to be low for the EVs. Conversely, as BVs in which the rated current of CC charge is less have a less inertial force, the charging fee is set so as to be high for the EVs.

In general, the rated current of CC charge is approximately from 1 C charge to high-rate charge of 10 C. When the SoC indicating the remaining amount of the secondary battery 11 is around 0% or 100%, the inertial force which can be provided is less even in the first charge mode with an inertial force. Thus, in the first charge mode, the remaining amount of the secondary battery 11 which can be obtained from the EV 50 may be set as the index of an inertial force, and a charging fee corresponding to the remaining amount of the secondary battery 11 may be set and presented to the operator of the EV 50.

As shown in FIG. 15, when the SoC exceeds 80%, CC charge is switched to CV charge, and charging current is gradually decreased. Thus, the inertial force which can be provided is gradually reduced. In consideration of this property of charging current, for example, 80% SoC may be determined as a threshold, and the charging fee may be changed based on the threshold. In this case, when the SoC is greater than or equal to 80%, the charging fee of the first charge mode is set so as to be higher than the standard fee which is originally set. It should be noted that, for example, a plurality of thresholds such as 85, 90 and 95% SoC may be set in advance, and the charging fee may be changed in stages based on these thresholds.

(4) Setting of Charging Fee for Inertial Force in Charging Direction

In the first charge mode with an inertial force, the charging fee may be changed depending on whether the direction of the inertial force is a charging direction or a discharging direction. For example, in a case where the EV 50 which can be charged with a maximum of 10 KW is charged with 8 kW (80% charged), if electric power becomes instantaneously excessive in another place, the electric power can be absorbed (an inertial force in a charging direction). Conversely, if electric power is insufficient in another place, the EV 50 may instantaneously stop charging and discharge (an inertial force in a discharging direction). Thus, in the case of 80% charging, the charging fee may be changed depending on whether the direction of the inertial force is a charging direction or a discharging direction. In this case, regarding an inertial force in a discharging direction, since the self-vehicle is slowly charged, the charging fee may be set so as to be lower than a charging direction.

In this regard, the operator of the EV 50 does not know whether the direction of the inertial force is a charging direction or a discharging direction. Thus, it is preferable that, for example, even in the first charge mode, a selective item for a 80% charge mode should be added. When a 80% charge mode is selected, the charging fee should be set depending on the amount of an inertial force in a charging direction and presented to the operator.

(5) Setting of Charging Fee Corresponding to Number of Times of Time of Provision of Inertial Force In the first charge mode, the charger 51 may count the number of times or time of the provision of an inertial force by the EV 50 and change the charging fee based on the count value. In this case, as the count value of the number of times or time of the provision of an inertial force is increased, the amount of the provided inertial force is increased. Thus, a discount may be made on the charging fee in stages.

(6) Setting of Charging Fee Corresponding to Provision of Inertial Force after Completion of Charge In the first charge mode with an inertial force, after the charge of the EV 50 is completed, the mode may be switched to a 0 kW charge command (0 KW discharge command). In other words, after the charge of the EV 50 is completed, the mode is switched to a 0 KW charge and discharge mode, and a waiting operation is performed. This configuration assumes that, even when the charge of the EV 50 is finished, the operator does not immediately pull out the charger 51. Since an inertial force is provided while the EV 50 is parked, a discount may be made on the charging fee depending on the inertial force. However, if the parking is continued, the parking fee is charged. Thus, a discount may be made on the parking fee depending on the inertial force, (7) Setting of Charging Fee in Consideration of Environmental Information For example, the performance of a battery changes depending on environmental information such as temperature. In association with the change, the magnitude of an inertial force also changes. Normally, as the temperature decreases, the capacity of a battery decreases, and the performance of the battery is degraded. When the performance is degraded, the inertial force which can be provided also becomes less. Thus, the charging fee should be preferably set in consideration of environmental information. Specifically, the charger 51 obtains environmental information such as temperature from the server 55 shown in FIG. 7, etc. The charger 51 determines the magnitude of the inertial force provided by the EV 50 based on the environmental information, sets a charging fee corresponding to the magnitude of the inertial force, and presents it to the operator through the presentation unit 53.

(8) Setting of Charging Fee Based on Transaction Information of Electricity Market In an electricity market, electricity charges are determined based on the demand for electricity. Thus, for example, the charging fee may be changed based on the transaction information of the electricity market of the previous day. When the price of electricity is high, the charging fee is increased in accordance with the price. Specifically, the charger 51 obtains the transaction information of the electricity market from the server 55 shown in FIG. 7, etc., sets the charging fee based on the transaction information and presents it to the operator through the presentation unit 53.

[Setting of Charge Command Value, Inertial Force and Droop Rate]

(1) Charging with Charge Command Value Less than Rated Charging Current

Regarding an inertial force in a charging direction, when the EV is charged with a maximum rated current, no more current can be supplied. Therefore, an inertial force in a charging direction cannot be provided. Thus, it is preferable that the EV 50 should be charged with a charge command value less than the rated charging current of the EV 50. For example, when only 1 C charge can be applied to the EV 50, the secondary battery 11 is charged with a charging current of approximately 0.8 C. When 2 C charge can be applied the EV 50, the secondary battery 11 is charged with a charging current of approximately 1.5 C. It should be noted that the charging current may not be constant while the battery is charged.

(2) Charging Direction with Inertial Force/Discharging Direction without Inertial Force In the first charge mode with an inertial force, a charging operation may be performed so as to have an inertial force for a charging direction and so as not to have an inertial force for a discharging direction. Specifically, the control unit 15 of the charger 51 is programmed so as to perform a charging operation with an inertial force for a charging direction and perform a charging operation without an inertial force for a discharging direction. Under the current rules, a reverse power flow to the electric system is prohibited. Therefore, the operation should be performed without an inertial force for a discharging direction. Thus, the rules of demanders are applied to a charging direction. The rules of electricity producers are applied to a discharging direction. It should be noted that, to suppress an electric change in charging stations, an inertial force in a discharging direction may be provided in a range in which a reverse power flow to the electric system does not occur.

(3) Charging Direction without Inertial Force/Discharging Direction with Inertial Force In the first charge mode with an inertial force, the operation may be performed so as not to have an inertial force for a changing direction and so as to have an inertial force for a discharging direction. Specifically, the control unit 15 of the charger 51 is programmed so as to perform a charging operation without an inertial force for a charging direction and perform a charging operation with an inertial force for a discharging direction. In a case where the operation is performed so as not to have an inertial force for a charging direction, when the EV 50 is charged fast with a maximum rated current, the charge can be completed in a time shorter than a case where the operation is performed so as to have an inertial force for a charging direction. In this regard, since an inertial force in a charging direction cannot be provided, it is preferable that the charging fee should be slightly increased compared to a case where the operation is performed so as to have an inertial force for a charging direction.

(4) Switching of Mode Corresponding to Remaining Amount

In the first charge mode with an inertial force, an inertial force which can be provided is less in an area in which the SoC indicating the remaining amount of a battery is less and an area in which the SoC is close to a full charge. Thus, the mode may be automatically switched to the second charge mode without an inertial force. For example, the first charge mode is applied to a range in which the SoC is 20 to 80%. The second charge mode is applied to a range in which the SoC is 0 to 20% and 80 to 100%.

(5) Setting of Droop Rate

The droop rate (speed regulation rate) of a synchronous generator is obtained by (the rate of increase in rotation speed/the rate of decrease in output)×100%. Specifically, when the speed regulation rate is R, the R is defined by the following equation (1).

$$R = \frac{\left(\frac{n_2 - n_1}{n_n}\right)}{\left(\frac{P_1 - P_2}{P_n}\right)} \times 100[\%] \quad (1)$$

R: Speed regulation rate [%]
$P_1$: Initial output power [MW]
$P_2$: Output power after change [MW]
$P_n$: Rated output power [MW]

$n_1$: Rotation speed in output power $P_1$ [min$^{-1}$]
$n_2$: Rotation speed in output power $P_2$ after change [min$^{-1}$]
$n_n$: Rated rotation speed [min$^{-1}$]

FIG. 16 is a diagram showing the relationship between a SoC and a droop rate.

In general, the droop rate is set so as to be approximately 2 to 7%. As the droop rate is increased, the output effective electric power to the electric system is increased. In other words, an inertial force is increased in both a charging direction and a discharging direction. In the above descriptions, this specification discusses the suppression of an instantaneous electric change. Now, this specification considers a case where electric power is insufficient or excessive for a long time, for example, for approximately 10 to 30 minutes. In a case where the EV 50 is charged in the first charge mode with an inertial force, when the electric power of the electric system is insufficient, the EV 50 has to continue to discharge. At this time, as shown in FIG. 16, when the droop rate is set so as to be high, the amount of discharge is great, and the secondary battery 11 may be fully discharged.

To avoid this situation, the droop rate is changed in a range of 0.1 to 20% based on the SoC. In a case where the first charge mode is set, the charger 51 obtains the information of the secondary battery 11 from the EV 50. When the SoC indicating the remaining amount of the secondary battery 11 is less, the charger 51 operates so as to make the droop rate less to decrease the amount of discharge. Conversely, when the SoC is great, the charger 51 operates so as to make the droop rate great to increase the amount of discharge.

(6) User Operation

After the charge of the EV 50 is started, the operator of the EV 50 may be allowed to switch the mode between the first charge mode and the second charge mode. For example, when the operator would like to prioritize the shortening of the charging time over the charging fee, the operator switches the first charge mode with an inertial force to the second charge mode without an inertial force by the operation of the input unit 52 shown in FIG. 7. When the charger 51 receives this instruction to switch the mode, the charger 51 performs a charging operation in the second charge mode without an inertial force. For example, the operator may send an instruction to the charger 51 by remote control from his/her smartphone to switch the charge mode.

(7) Inertia Constant

One of the constants to determine an inertial force is an inertia constant Ms (second). The inertia constant is a constant to determine how long an inertial force can be maintained. As an inertial force is greater, an effect of suppressing an electric change is increased. However, if an inertial force is extremely great, the operation is stopped by the protection feature of an inverter (for example, overload detection). Thus, an appropriate value should be set.

The inertia constant of general fuel generators is approximately 2 to 10 seconds. By adjusting this inertia constant, the inertial force which is provided by the EV 50 can be adjusted. For example, when the proportion of renewable energy power source is high, an electric change is large. Thus, for example, a measure of setting the inertial force so as to be relatively high can be taken.

(8) Setting of Charge Command Value

The charger 51 may change a charge command value depending on the situation of the supply and demand for the electricity of the electric system. For example, when the situation of the supply and demand for electricity is tight, the charge command value is decreased from 20 KW to 15 kW to perform a power saving charge.

Alternatively, an operation target time may be calculated based on the desired charge completion time set by the operator of the EV 50 through the input unit 52. The charge command value may be set so as to be a different value based on the operation target time. For example, when the charge completion time is set so as to be two hours later, the EV 50 is charged with a charge command value of 10 kW. When the charge completion time is set so as to be four hours later, the EV 50 is charged with a charge command value of 5 kW. By this configuration, in the first charge mode with an inertial force, the time to provide an inertial force can be elongated. In the second charge mode without an inertial force, when the situation of the supply and demand for electricity is tight, a power saving charge can be performed.

When the charge of the EV 50 is started, by gradually increasing the charge command value, a rapid electric change in the charging station 62 shown in FIG. 9 can be avoided. For example, when the EV 50 should be charged with a charge command of 20 KW, the charge command value is gradually increased from 0 KW to 5 kW, 10 KW and 20 kW.

When the charge command value is changed, by making the droop rate great, an electric change can be absorbed. For example, when the current charge command value of 5 KW should be changed to 10 KW, the following operations can be considered:

in a state where the charge command value is 5 kw and the droop rate is 4%, change the droop rate from 4% to 6% (charge command value 5 kw, droop rate 6%);

change the charge command value from 5 KW to 10 kW (charge command value 10 kW, droop rate 6%); and return the droop rate to 4% (charge command value 10 KW, droop rate 4%).

[Determination of Type of Vehicle and Collection of Fee]

The charger 51 (specifically, the control unit 15 provided in the charger 51) comprises a table T1 for determining an inertial force as shown in FIG. 17, In the table T1, the information of types of various EVs (vehicle models and the like) and the information regarding the inertial force of these EVs (whether or not each EV has an inertial force, the magnitude of an inertial force and the like) are stored in association with each other. In the figure, D1, D2 and D3 indicate the information of types of vehicles. In the figure, F1 and F2 indicate the magnitude of an inertial force (for example, F1>F2).

The charger 51 determines the type of the EV to be charged, reads the applicable information of an inertial force from the table T1 based on the result of the determination, and determines whether or not the EV has an inertial force and how great the inertial force is. The charger 51 determines whether or not each EV has an inertial force because, if an EV which does not have an inertial force is erroneously caused to provide an inertial force, the secondary battery of the EV may be broken. For EVs which do not have an inertial force, the charger 51 prohibits the first charge mode with an inertial force and charges the EVs in the second charge mode without an inertial force.

As a method of determining the type of the vehicle, for example, the image of a camera provided near the charger 51 is recognized, and the type of the EV 50 is determined based on the result of the recognition. As another method, the type of the EV 50 may be determined based on the information of the type of the vehicle which is transmitted and obtained from a specific communication device provided in the EV 50 such as an electronic toll collection system (ETC). Alternatively, the type of the EV 50 may be determined based on the information of the type of the vehicle obtained through a communication line from the outside in accordance with the charging standard of the charge connector. These types of information may be used independently or in combination with each other. As a method of collecting the charging fee, the charging fee may be collected through an in-vehicle ETC.

(Hardware Configuration)

Figure 18:
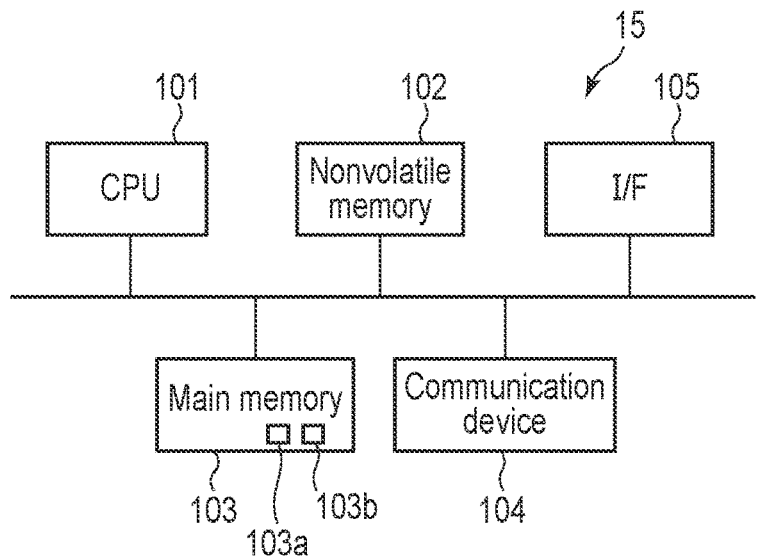
FIG. 18 is a diagram showing an example of a hardware configuration of a computer provided in a charger in the embodiment.

FIG. 18 is a diagram showing an example of a hardware configuration of a computer provided in the charger 51. The charger 51 comprises, as the constituent elements of the hardware of the computer, a CPU 101, a nonvolatile memory 102, a main memory 103, a communication device 104, an interface (I/F) 105, etc.

The CPU 101 is a hardware processor which controls the operation of the control unit 15 shown in FIG. 7. The CPU 101 performs various programs loaded from the nonvolatile memory 102 which is a storage device into the main memory 103. The programs executed by the CPU 101 include a program (charge control program) 103a for performing control based on a charge mode such as algorithm simulating a synchronous generator and a program (charging fee setting program) 103b for performing the setting process of a charging fee.

These programs 103a and 103b may be stored in a computer-readable recording medium and distributed, or may be downloaded to another computer through a network. It should be noted that some or all of the processes related to this system may be realized by hardware such as an integrated circuit (IC) or a combined configuration of the software and hardware.

The table T1 for determining an inertial force shown in FIG. 17 is provided in the nonvolatile memory 102, etc. The communication device 104 is, for example, a device configured to perform communication with an external device with a wire or wirelessly and has a function of connection to the server 55 shown in FIG. 7. For example, the I/F 105 is connected to the input unit 52 and the presentation unit 53 and performs the input/output operation of various types of information.

Figure 19:
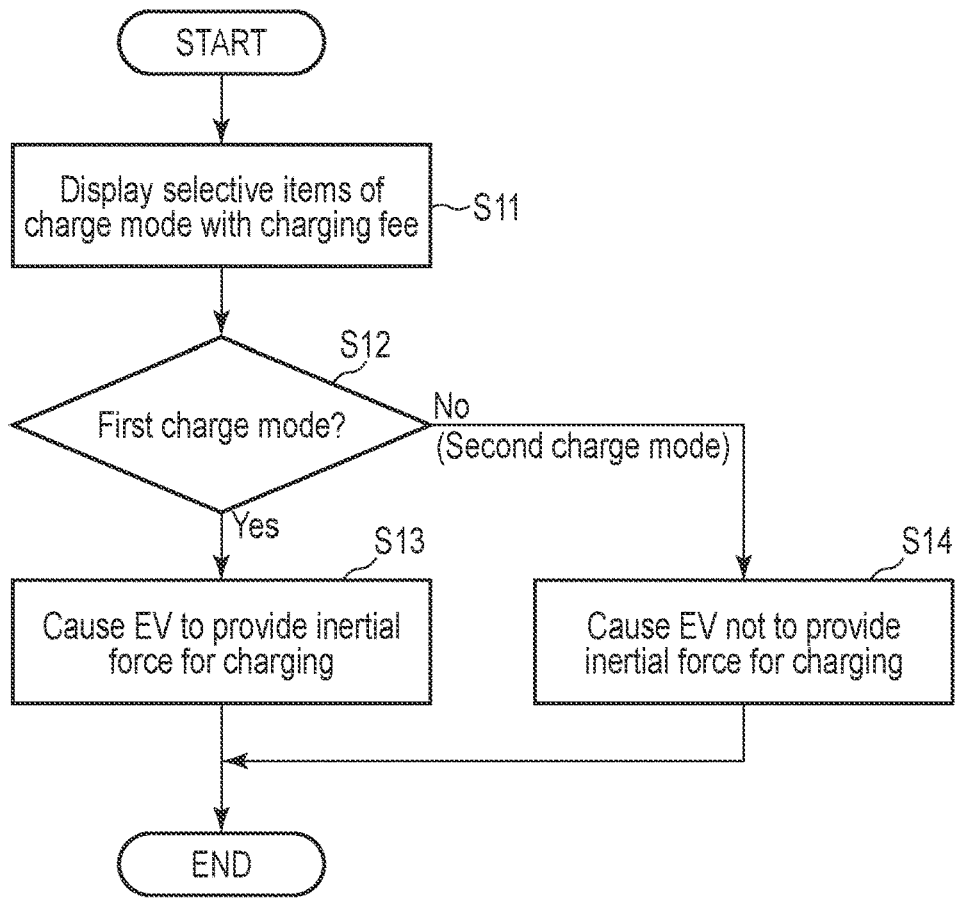
FIG. 19 is a flowchart showing a charging process in the embodiment.

FIG. 19 is a flowchart showing a charging process of this system. The process shown in the flowchart is realized when the computer provided in the charger 51, in other words, the CPU 101 (the control unit 15), reads the programs 103a and 103b described above. For example, in the charging station 60 shown in FIG. 8, the CPU 101 performs the following charging process at a time point when the EV 50 is connected to the charger 51. The EV 50 is assumed to be an EV having an inertial force.

The CPU 101 displays the selective items 71 and 72 of a charge mode on the touch panel 70 with charging fees as shown in FIG. 13 (step S11). The selective item 71 is an item for selecting the first charge mode with an inertial force. The selective item 72 is an item for selecting the second charge mode without an inertial force.

Here, when the operator of the EV 50 selects the first charge mode by touching the selective item 71 (Yes in step S12), the CPU 101 controls the operation of the inverter 12 provided in the charger 51 in accordance with algorithm simulating a synchronous generator (step S13). Thus, a state in which an inertial force is provided by the EV 50 for charging is produced by causing the inverter 12 to operate as a synchronous generator in a pseudo-manner. When the operator of the EV 50 selects the second charge mode by touching the selective item 72 (No in step S12), the CPU 101 controls the operation of the inverter 12 in accordance with a normal control system (step S14). In this case, the EV 50 does not provide an inertial force.

In this way, the system comprises the first charge mode and the second charge mode and performs a charging operation using the control system of a virtual synchronous generator by selecting the first charge mode. Thus, when an electric change (frequency change) occurs in the electric system 61, the electric change can be suppressed by the inertial force provided by the EV 50, thereby stabilizing the supply of electric power.

The operator can arbitrarily select whether or not an inertial force should be provided for charging by selecting the mode. At this time, when a charging fee corresponding to each charge mode is presented, the operator can consider the charging fee to select the mode.

Figure 20:
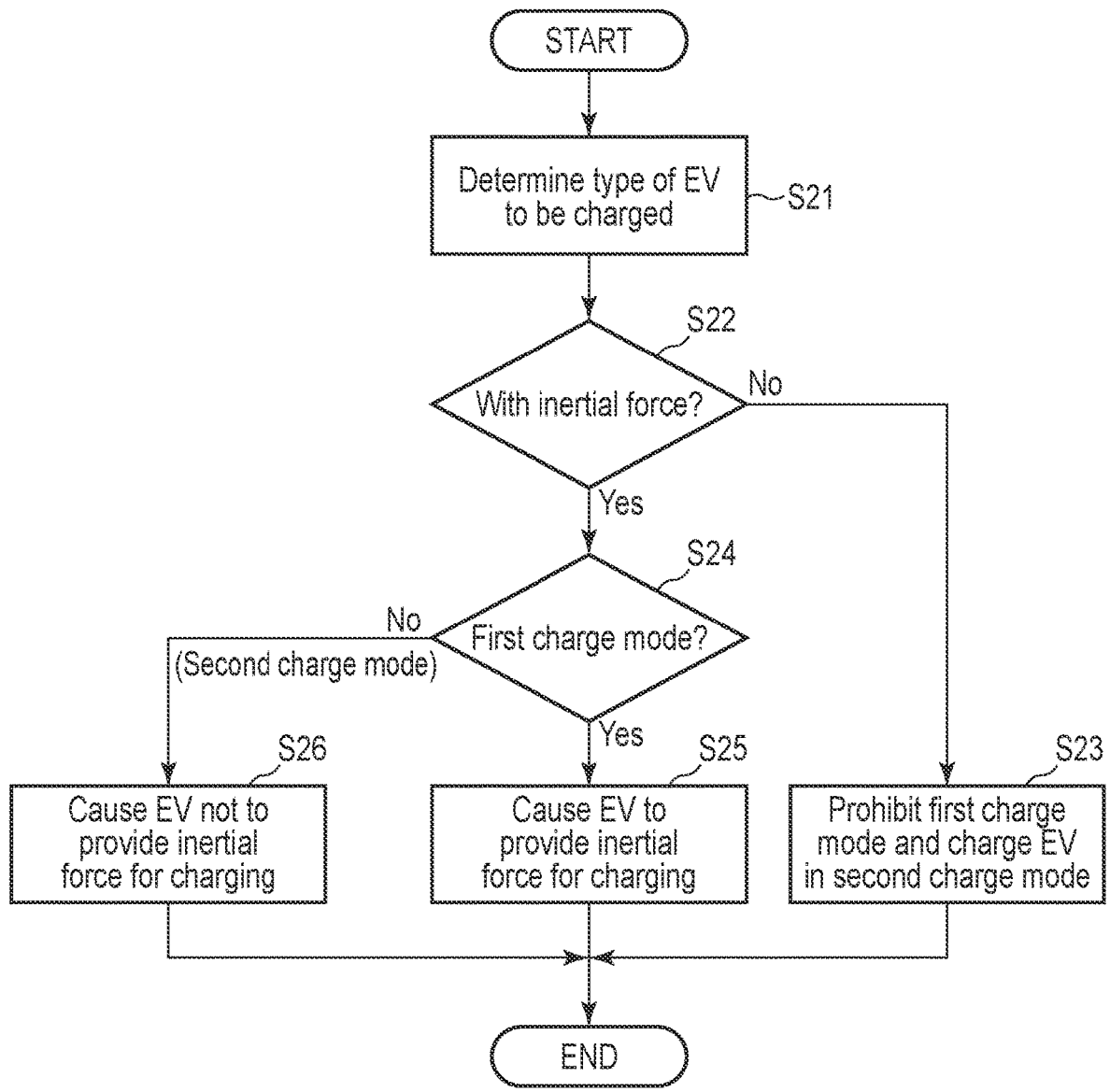
FIG. 20 is a flowchart showing another charging process in the embodiment.

FIG. 20 is a flowchart showing another charging process in the system. In a manner similar to that of the flowchart of FIG. 19, the process shown in the flowchart of FIG. 20 is realized when the computer provided in the charger 51, in other words, the CPU 101 (the control unit 15), reads the programs 103a and 103b described above.

In FIG. 19, the EV 50 is charged in the charge mode selected by the operator. However, in a case where the EV 50 does not have the ability to provide an inertial force, if the EV 50 is charged in the first charge mode with an inertial force, the secondary battery 11 of the EV 50 may be broken. To solve this problem, the CPU 101 determines the type of the EV 50 before charging the EV 50 in the charge mode selected by the operator (step S21). As described above, for a method of determining the type of the vehicle, in addition to the image recognition of a camera, the information obtained from an ETC or the charging standard can be used.

When the type of the EV 50 is determined, the CPU 101 determines whether or not the EV 50 has an inertial force with reference to the table T1 for determining an inertial force shown in FIG. 17 (step S22). When the CPU 101 determines that the EV 50 does not have an inertial force (No in step S22), the CPU 101 prohibits the first charge mode with an inertial force and performs a charging operation in the second charge mode without an inertial force (step S23). In this case, for example, on the touch panel 70 shown in FIG. 13, the selective item 71 may not be displayed, or a warning indicating that the first charge mode cannot be selected may be given by display or sound. Even if the operator selects the first charge mode, it is preferable that the selection should be invalidated and the EV 50 should be charged in the second charge mode.

When the CPU 101 determines that the EV 50 has an inertial force (Yes in step S22), the CPU 101 charges the EV 50 in the first charge mode or the second charge mode in accordance with the selection of the operator (steps S25 and S26). In the first charge mode, an inertial force is provided. In the second charge mode, an inertial force is not provided.

In this way, charging is performed after confirming whether or not the EV 50 has an inertial force. This configuration enables the avoidance of a situation in which the secondary battery 11 of the EV 50 is broken by erroneously charging the EV 50 in the first charge mode when the EV 50 does not have an inertial force.

It should be noted that FIG. 19 and FIG. 20 merely show examples of a charging process. The various types of processes which are related to charging and described in the above sections "Setting of Charging Fee", "Charge Command Value, Inertial Force and Setting of Droop Rate", "Determination of Type of Vehicle and Collection of Fee", etc., are performed by the CPU 101 (control unit 15) provided in the charger 51.

In the present embodiment, an electric vehicle is explained as an example of an electric mobile body. However, the same configuration is applied to a bus, a bike, a ship, a plane, a drone, etc. As long as the mobile body comprises a battery and can run on the power of the battery as a power source, the present embodiment can be applied.

At least one embodiment described above can provide a charging system which can suppress an electric change in an electric system and stabilize electric power supply by using the inertial force of a mobile body in the middle of charging.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A charging system which charges a secondary battery provided in a mobile body, the system comprising:
    a controller which selects one of a first charge mode which charges the secondary battery by simulating a synchronous generator and a second charge mode which charges the secondary battery without simulating the synchronous generator; and
    a charger which charges the secondary battery by an operation corresponding to the first charge mode or the second charge mode selected by the controller.

2. The charging system of claim 1, further comprising an input device for giving an instruction of the first charge mode or the second charge mode, wherein
    the controller selects the first charge mode or the second charge mode in accordance with the instruction from the input device.

3. The charging system of claim 1, wherein
    the controller controls the charger in the first charge mode such that an inverter provided in the charger has a property equivalent to the synchronous generator based on information of a current sensor which detects an output current of the inverter and information of a voltage sensor which detects an output voltage of the inverter.

4. The charging system of claim 1, further comprising a presentation device which presents a charging fee corresponding to the first charge mode or the second charge mode.

5. The charging system of claim 4, wherein
    the presentation device presents a charging fee corresponding to an inertial force of the mobile body from a plurality of fee structures in the first charge mode.

6. The charging system of claim 5, wherein
    the presentation device presents a charging fee corresponding to a rated current of the secondary battery by setting the rated current of the secondary battery as an index of an inertial force.

7. The charging system of claim 5, wherein
    the presentation device presents a charging fee corresponding to a remaining amount of the secondary battery by setting the remaining amount of the secondary battery as an index of an inertial force.

8. The charging system of claim 7, wherein
    the charging fee corresponding to the remaining amount of the secondary battery is changed based on at least one threshold determined in consideration of a property of a charging current.

9. The charging system of claim 5, wherein
    the presentation device presents a charging fee related to an inertial force in a charging direction when the charger provides the inertial force in the charging direction and an inertial force in a discharging direction in the first charge mode.

10. The charging system of claim 5, wherein
    the presentation device presents the charging fee by discounting a fee corresponding to the number of times or time that the mobile body provides an inertial force in the first charge mode.

11. The charging system of claim 1, wherein
    the controller switches the first charge mode to a charge and discharge mode after completion of charge of the secondary battery in the first charge mode.

12. The charging system of claim 11, further comprising a presentation device which presents a charging fee by discounting a fee corresponding to an inertial force which is provided while the mobile body waits after completion of charge of the secondary battery.

13. The charging system of claim 5, wherein
    the presentation device presents the charging fee in consideration of environmental information including at least temperature in the first charge mode.

14. The charging system of claim 1, wherein
    the controller controls an operation of the charger so as to charge the secondary battery at a current value less than a rated current value of the secondary battery in the first charge mode.

15. The charging system of claim 1, wherein
    the controller performs control so as to have an inertial force for a charging direction and so as not to have an inertial force for a discharging direction in the first charge mode.

16. The charging system of claim 1, wherein
    the controller performs control so as not to have an inertial force for a charging direction and so as to have an inertial force for a discharging direction in the first charge mode.

17. The charging system of claim 1, wherein
    the controller comprises a table in which information related to an inertial force is stored for each of types of different mobile bodies,
    determines a type of a mobile body to be charged,
    determines whether the mobile body has an inertial force with reference to the table based on a result of the determination, and
    prohibits the first charge mode and performs charging in the second charge mode when the mobile body does not have an inertial force.

18. The charging system of claim 17, wherein
    the controller recognizes an image of the mobile body and determines the type of the mobile body based on a result of the recognition.

19. The charging system of claim 17, wherein
    the controller determines the type of the mobile body based on information of the type of the mobile body transmitted from a communication device mounted on the mobile body.

20. The charging system of claim 17, wherein
    the controller determines the type of the mobile body based on information of the type of the mobile body obtained from outside in accordance with a charging standard used for the mobile body.

* * * * *